No. 800,269. PATENTED SEPT. 26, 1905.
T. P. CORBOY.
TOOL FOR REMOVING AND REPLACING CUSHION TIRES.
APPLICATION FILED JUNE 5, 1905.
2 SHEETS—SHEET 1.
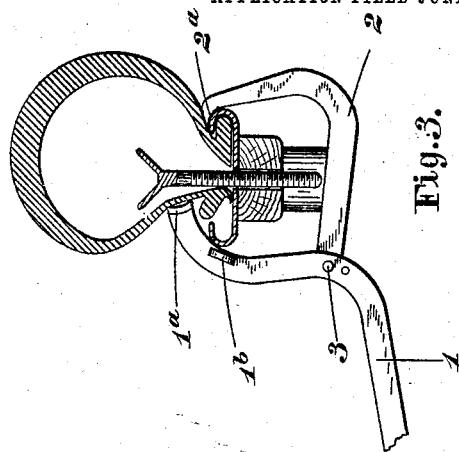
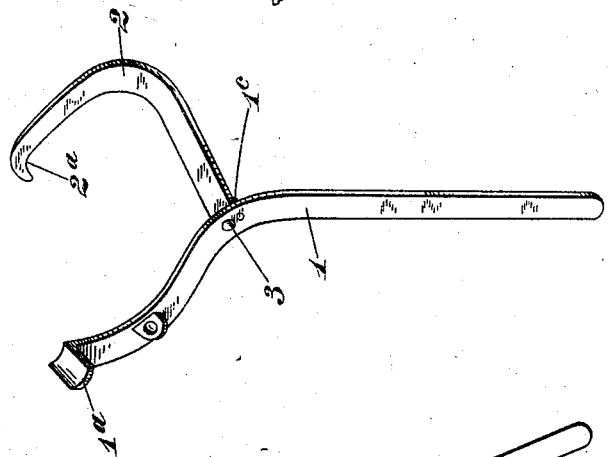
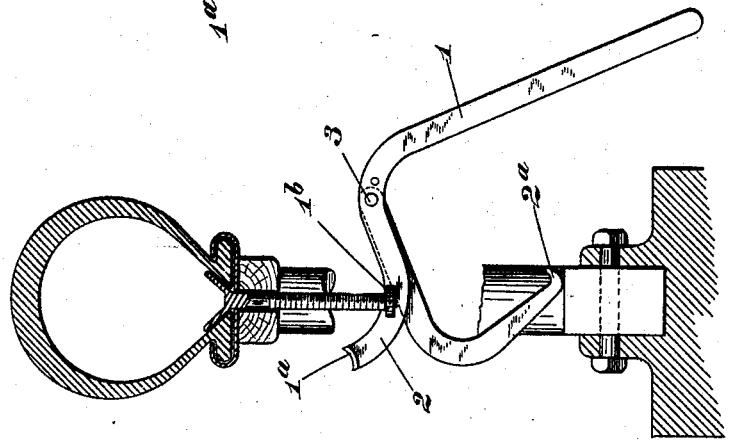
Witnesses
Benj. Finckel
Alice B. Cook.
Inventor
Thomas P. Corboy
by Finckel & Finckel
his Attorneys No. 800,269. PATENTED SEPT. 26, 1905.
T. P. CORBOY.
TOOL FOR REMOVING AND REPLACING CUSHION TIRES.
APPLICATION FILED JUNE 5, 1905.

2 SHEETS—SHEET 2.

Witnesses
Benj. Finckel
Alice B. Cook.

Inventor
Thomas P. Corboy
by Finckel & Finckel
his Attorneys

UNITED STATES PATENT OFFICE.

THOMAS P. CORBOY, OF COLUMBUS, OHIO.

TOOL FOR REMOVING AND REPLACING CUSHION-TIRES.

No. 800,269.      Specification of Letters Patent.      Patented Sept. 26, 1905.

Application filed June 5, 1905. Serial No. 263,862.

*To all whom it may concern:*

Be it known that I, THOMAS P. CORBOY, a citizen of the United States, residing at Columbus, in the county of Franklin and State of Ohio, have invented certain new and useful Improvements in Tools for Removing and Replacing Cushion-Tires; and I do hereby declare the following to be a full, clear, and exact description of the invention, such as will enable others skilled in the art to which it appertains to make and use the same.

The object of this invention is to provide a combination-tool for use in removing and replacing cushion-tires, and especially cushion-tires of the pneumatic variety.

Pneumatic tires, especially large tires of this variety, such as are now used on the wheels of automobiles, are held on the rim by means of a lug or bolt having a threaded shank and a laterally-enlarged head, the lateral enlargements of which clamp or engage the lips of the tire to hold it in place while the shank is passed through the rim and secured with a nut. This lug is often quite difficult to dislodge when it becomes necessary to remove the tire. It is therefore an important feature of my invention to embody in it, as I do, a construction whereby the same members that are employed for removing and replacing the tire may be used for removing the lug and aid in replacing it. The importance of the proposed construction arises from the fact, among others, that a multiplicity of tools and the expense of them for doing the work are avoided and much time and annoyance saved by avoiding the necessity for hunting and picking up different tools.

The invention consists in the construction hereinafter described and claimed.

Figure 5:
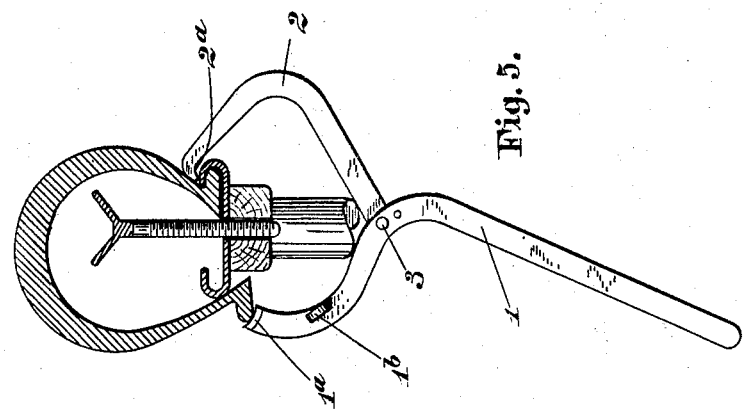
Figure 4:
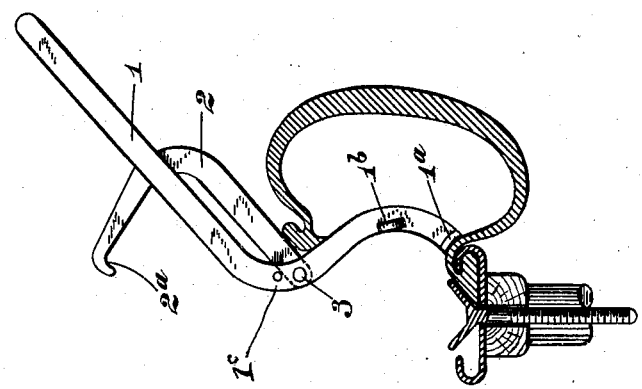

In the accompanying drawings, Figure 1 is a perspective view of the tool. Fig. 2 is a view illustrating the tool as used in dislodging a tire-holding lug. Fig. 3 is a view illustrating the tool lifting one side of a pneumatic tire out of the channel. Fig. 4 is a view illustrating the tool as holding the tire up in position to permit the removal or replacing of the tire-holding lug. Fig. 5 illustrates the tool as applied in replacing a pneumatic tire.

In the several views, 1 designates the principal member or lever, and 2 is a fulcrum member or hook-arm which is suitably pivoted to the lever at 3. The lever 1 is shown to have its handle-arm, which is at one side of the pivotal point, straight and its tire-engaging arm curved. The extremity of the tire-engaging arm is made with a laterally-extending portion $1^a$, having a curved face to fit against the tire or portions thereof, so as to prevent much slipping on or abrasion of the tire. The tire-engaging arm of the lever 1 is also provided with a lateral projection $1^b$, located about midway between the projection $1^a$ and the pivotal point 3. The projection $1^b$ can be slightly concaved to afford a seat for the end of the tire-holding lug, as seen in Fig. 2. The projections $1^a$ and $1^b$ both extend from one side of the lever 1, while the hook-arm 2 is pivoted to swing at the opposite side of said lever. The arm 2 is shown to be made with a hook $2^a$ at its end to engage the edge of the tire-channel, and the lever 1 is provided with a stop-pin $1^c$, that projects laterally from the side of the arm 1 on which the arm 2 is pivoted, said pin serving as a rest for the arm 2 to hold it up at an angle to the lever when said arm is to be engaged with the tire-channel or to hold said arm in other positions, if desired. It will be observed that because the projections $1^a$ and $1^b$ are on one side of the lever 1 the arm 2 can be swung in nearly a complete circle and in either direction past that extremity of the lever 1 which bears the projection $1^a$.

In practice the tool can be used to first dislodge a tight tire-holding lug, as depicted in Fig. 2. In this use the arm 2 is rested on the hub in the crotch between the spokes of the wheel and the inner end of the lug engaged by the curved arm of the lever 1 or by the projection $1^b$ thereon. After the lug has been loosened the parts can be placed in the position shown in Fig. 3 and one of the lips of the tire lifted out of the rim. To get at the lug to remove it or to replace a removed lug, the tire can be raised up by the lever 1 alone, as shown in Fig. 4, the curved arm of said lever facilitating this operation. To replace a tire, the lip thereof is engaged by the curved seat of the lateral projection $1^a$, as depicted in Fig. 5.

What I claim, and desire to secure by Letters Patent, is—

1. In a tool for removing and replacing tires, the combination of the lever having one end formed as a handle, and its other end provided with a tire-engaging lateral projection, and a hook-arm to engage the wheel pivoted to said lever so as to swing past the end bearing the tire-engaging projection.

2. In a tool for removing and replacing tires, the combination of the lever having one end formed as a handle, and its other end curved and provided at its extremity with a tire-engaging lateral projection and a hook-arm to engage the wheel pivoted to said lever so as to swing past the end bearing the tire-engaging projection.

3. In a tool for removing and replacing tires, the combination of the lever having one end formed as a handle, and its other end provided with a tire-engaging lateral projection on one side of the lever, a hook-arm to engage the wheel pivoted on the opposite side of the lever to swing past the end bearing the tire-engaging projection, and a pin projecting from the same side of the lever to support the hook-arm at an angle to the lever.

4. In a tool for removing and replacing tires, the combination of the lever having one end provided with a tire-engaging and a lug-engaging projection on one side of the lever, a hook-arm pivoted on the opposite side of the lever adapted to swing past the end bearing the tire-engaging projection and a pin on the same side of the lever to support the hook-arm at an angle to the lever.

In testimony whereof I affix my signature in presence of two witnesses.

THOMAS P. CORBOY.

Witnesses:
SAMUEL W. LATHAM,
BENJ. FINCKEL.